UNITED STATES PATENT OFFICE.

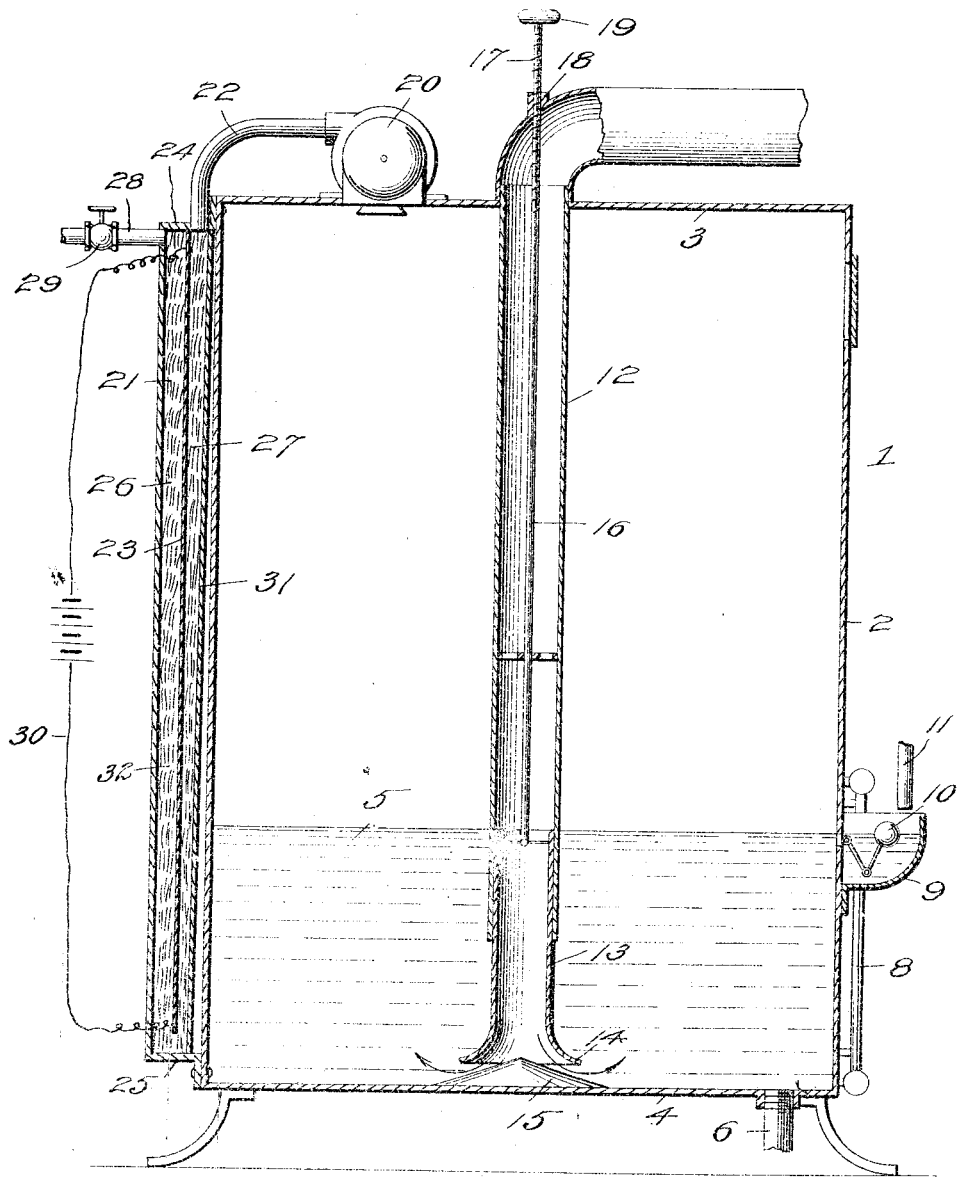

JOHN C. FLEMING, OF BOSTON, MASSACHUSETTS.

DOMESTIC VENTILATOR.

1,182,260.

Specification of Letters Patent.  Patented May 9, 1916.

Application filed June 8, 1915. Serial No. 32,960.

*To all whom it may concern:*

Be it known that I, JOHN C. FLEMING, a citizen of the United States, residing at Boston, in the county of Suffolk and State of Massachusetts, have invented certain new and useful Improvements is Domestic Ventilators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to domestic ventilators and has for its object to provide a device for purifying air, and which can be employed for charging or impregnating atmospheric air so that it will partake of the properties of the atmosphere of different localities, such as for instance the atmosphere on the sea coast or the atmosphere in mountainous regions.

With this object in view the invention consists in the novel construction of apparatus for purifying atmospheric air and for drying the same, and the invention also consists in the construction for charging atmospheric air for ventilating purposes, so as to cause same to partake of the properties of atmospheric air existing in certain localities.

The invention further consists in certain details of construction and combinations of parts, all of which will be first fully described and afterward specifically pointed out in the appended claims.

Referring to the accompanying drawing, the figure is a vertical sectional view taken through an apparatus constructed in accordance with this invention.

Referring to the figure by reference numerals, 1 indicates the apparatus including a preferably square receptacle 2 having a top 3 and bottom 4, the same being of a character to contain a liquid 5 which may be plain water or which may be a solution of a suitable ingredient or ingredients so as to charge and impregnate the atmospheric air in the manner desired. For instance the liquid 5 may be a solution of sea salt if it be desired to charge, saturate or impregnate the air to partake of the properties of sea air, or the liquid 5 may be a solution of carbonate of potassium so as to cause the air to partake of the properties of mountain air, it being of course understood that the character of the solution may be varied or changed to meet existing requirements without departing from the spirit of this invention.

The bottom 4 of the tank or receptacle 2 is provided with a drain pipe 6, while the tank 2 is provided with a valve 7 to provide ready and convenient access to the tank or receptacle 2 for the purpose of flushing and cleaning the same, and for the insertion of desired ingredients.

Arranged conveniently on the tank 2 is a water gage 8 while a trough 9 is also positioned as shown, which trough carries a float valve 10 so that the height of the liquid 5 is automatically maintained at proper level within the receptacle, a water feed pipe 11 being provided for feeding the trough 9.

Arranged centrally and vertically of the atmospheric air tank or receptacle 2 is the atmospheric air supply and regulating pipe 12 which extends below the surface of the liquid 5 and embodies a telescopic section 13 having a flared end 14 terminating in association with a deflector 15 positioned on the bottom 4 of the tank or receptacle 2. Extending vertically of the atmospheric air supply pipe 12 is a manually operable adjusting rod 16 threaded at 17 into an internally threaded boss 18, the said rod 16 being provided with a hand-wheel 19 for manual rotation. The lower end of the rod 16 is suitably connected to the telescopic section 13 so that upon rotation of the rod 16 the telescopic section 13 can be raised or lowered with relation to the deflector 15 so as to increase or diminish the space or opening between the flared end 14 of the section 13 and the deflector 15. By means of this construction the quantity of atmospheric air passing from the atmospheric air supply pipe 16 can be regulated. The purpose of this construction is that in winter the regulator is raised so as to admit a greater quantity of air, which means more pressure and greater heat; while in summer the regulator is lowered, admitting less air, causing a more rarefied condition of same within the receptacle and having a tendency to cool the air therein.

When the movable section 13 is raised toward or near the surface of the liquid, the air in the receptacle above the surface of the liquid will be relatively slightly rarefied, under the action of the pump for the reason that only a relatively slight minus pressure in the receptacle is necessary to cause the atmospheric pressure in the supply pipe 12 to force air to the bottom thereof and into the liquid. On the other hand when the movable section 13 is in a lowered position an increased rarefaction or minus pressure must be maintained within the receptacle above the surface of the liquid so as to allow atmospheric pressure in the supply pipe to force air to the bottom thereof and through the liquid, it being of course understood that the pressure within the supply pipe is constant. This result would obviously not be obtained were the air forced through the liquid by pump pressure, for by such an arrangement the pressure within the supply pipe would vary according to the position of the movable member 13, but the pressure within the receptacle above the surface of the liquid would be constant, which would defeat one of the primary objects of applicant's invention—namely, that of controlling the extent of rarefaction of the air.

Arranged as shown in the drawing is an air pump 20 of such character and construction to produce a partial vacuum within the interior of the tank or receptacle 2, so that the atmospheric air will be forced through the supply pipe 2 and through the liquid 5 in the receptacle by atmospheric pressure, the air so passing into the tank or receptacle 2 being drawn through the pump 20 and discharged therefrom into the chamber 21 through the exhaust connection 22.

As shown in the drawing the chamber 21 having its sides covered with fabric 32 extends vertically of the tank or receptacle 2 and is of relatively great height, and is provided vertically and longitudinally thereof with a plate 23 of high electrical resistance, the said plate 23 being connected to the top 24 of the receptacle 21 and terminating at a point above the bottom 25 of said receptacle 21, thus dividing said receptacle into two compartments 26 and 27, the said pump 20 discharging and exhausting the air from the receptacle 2 into the innermost compartment 27 of the receptacle 21.

As shown in the drawing the outermost compartment 26 is provided at its upper end with a discharge pipe 28 in which is located a globe or gate valve 29 through which pipe 28 and valve 29 the air passes from the apparatus, and as will be of course understood may be directed in the manner desired for the purpose of accomplishing the objects of the invention.

As will appear from the drawing the resistance plate 23 is arranged in an electrical circuit 30 by means of which the resistance plate 23 is raised to a high temperature so that the air discharged from the pump 20 into the inner compartment 27 of the chamber 21 passes along the heated surface of the resistance plate 23 to the bottom thereof and upwardly along the heated surface of the plate 23 to the discharge pipe 28.

I prefer to arrange in the chamber 21 an oblique deflector plate 31 so as to deflect the air against the heated surface of the resistance plate 23 during its downward passage through the compartment 27. By means of this construction the air discharged from the tank or receptacle 2 into the chamber 21 is heated and dried by the resistance plate 23 when desired, which air has been first purified, charged, impregnated or saturated within the receptacle 2.

Having thus fully described the invention it is apparent that the same is susceptible of changes and alterations in the construction and arrangement of the parts, and I consider myself clearly entitled to all such modifications as fall within the limit and scope of the appended claims.

What I claim as new and desire to secure by Letters Patent of the United States is—

1. A device for heating and purifying air including a liquid holding receptacle, an atmospheric air supply pipe including a telescopic section having its lower end arranged below the surface of the liquid in the receptacle and adjustable relative to the surface of the liquid, and means for creating a partial vacuum within the receptacle above the surface of the liquid therein to cause air to pass from the air supply pipe through the liquid in the receptacle by atmospheric pressure.

2. A device for purifying air and regulating the temperature thereof comprising a liquid containing receptacle, means for creating a partial vacuum within the receptacle above the surface of the liquid, an air supply pipe having its inner end within the liquid in the receptacle and adjustable with relation to the surface of the liquid in the receptacle to control the extent of partial vacuum within the receptacle.

3. A device of the character described including a liquid containing receptacle, means for creating a partial vacuum within the receptacle above the surface of the liquid and to deliver air therefrom, means for heating the air delivered from the receptacle, an air supply pipe having its inner end below the surface of the liquid in the receptacle, and means for adjusting the inner end of the pipe with relation to the surface of the liquid within the receptacle to regulate the extent of partial vacuum within the receptacle and the consequent density of the air delivered therefrom.

In testimony whereof I affix my signature in presence of two witnesses.

JOHN C. FLEMING.

Witnesses:
C. HUGH DUFFY,
FRED COURT.